US009047264B2

(12) United States Patent
Kanigicherla et al.

(10) Patent No.: US 9,047,264 B2
(45) Date of Patent: Jun. 2, 2015

(54) LOW PIN COUNT CONTROLLER

(75) Inventors: Balaji Kanigicherla, Andhra Pradesh (IN); Siva Raghuram Voleti, Hyderabad (IN); Rajani Lotti, Hyderabad (IN); Krishna Mohan Tandaboina, Hyderabad (IN)

(73) Assignee: INEDA SYSTEMS PVT. LTD., Hyderabad (IN)

( * ) Notice: Subject to any disclaimer, the term of this patent is extended or adjusted under 35 U.S.C. 154(b) by 0 days.

(21) Appl. No.: 14/111,432

(22) PCT Filed: Apr. 9, 2012

(86) PCT No.: PCT/IN2012/000253
§ 371 (c)(1),
(2), (4) Date: Oct. 11, 2013

(87) PCT Pub. No.: WO2012/140669
PCT Pub. Date: Oct. 18, 2012

(65) Prior Publication Data
US 2014/0032792 A1 Jan. 30, 2014

(30) Foreign Application Priority Data
Apr. 11, 2011 (IN) .............................. 1260/CHE/2011

(51) Int. Cl.
*G06F 13/28* (2006.01)
*G06F 13/24* (2006.01)

(52) U.S. Cl.
CPC ................ *G06F 13/24* (2013.01); *G06F 13/28* (2013.01); *G06F 2213/0038* (2013.01)

(58) Field of Classification Search
None
See application file for complete search history.

(56) References Cited

U.S. PATENT DOCUMENTS

| 6,157,970 A * | 12/2000 | Gafken et al. .................. 710/27 |
| 2003/0065893 A1 | 4/2003 | Lary et al. |
| 2003/0149808 A1 * | 8/2003 | Burton et al. ................... 710/19 |
| 2004/0006661 A1 | 1/2004 | Hu et al. |
| 2004/0250063 A1 * | 12/2004 | Gulick et al. ................. 713/160 |
| 2005/0144336 A1 | 6/2005 | Lin |

FOREIGN PATENT DOCUMENTS

CN 1414488 4/2003

\* cited by examiner

*Primary Examiner* — Driss N Alrobaye
*Assistant Examiner* — David Martinez
(74) *Attorney, Agent, or Firm* — Workman Nydegger

(57) ABSTRACT

Described herein is a system having a multi-host low pin count (LPC) controller (100) configured to facilitate sharing of common peripheral devices by multiple hosts (115) of a multi-host computing system (110). In one implementation, the multi-host LPC controller (100) interfaces with the hosts (115) via an ON-chip bus or an LPC-IN-chip bus. Further, the multi-host LPC controller (100) includes a LPC-IN controller (160) and a microcontroller (155) to moderate among requests generated by the hosts (115). The requests can be target accesses, DMA accesses, and BM accesses. Also, the multi-host LPC controller (100) is configured to operate in a software mode and an auto mode. Based on the mode the multi-host LPC controller (100) is operating in, the requests generated by the various hosts are moderated.

14 Claims, 3 Drawing Sheets

LOW PIN COUNT CONTROLLER

TECHNICAL FIELD

The present subject matter relates, in general, to computing systems and, in particular, to a low pin count controller for the computing systems.

BACKGROUND

Conventional computing systems include a variety of peripheral devices, such as input/output (I/O) devices and storage devices that communicate with the computing systems' processing unit via an Industry Standard Architecture (ISA) bus or an Expansion bus (X-bus). In order to interface the processing unit with the peripheral devices, the processing unit includes a large amount of pins, and an associated circuitry to support the ISA bus signals or the X-bus signals support.

However, large number of pins needed to support the ISA bus and the X-bus results in reduction in efficiency in terms of manufacturing quality and reliability, and increase in size of the computing systems, which in turn adds to overall cost of the computing system. To make the computing systems, or to say, processing units of the computing systems somewhat compact and efficient, a low pin count (LPC) bus is implemented, which supports the peripheral devices with relatively lesser number of pins.

Generally, multiple platform components, such as embedded controller, super I/O chip, firmware hub, keyboard controller, and mouse controller, are interfaced with the LPC bus. Further, to facilitate a seamless access to the peripheral components by the processing unit the platform components are controlled by a controller often referred to as a LPC controller. The LPC controller typically supports a single processing unit; accordingly a single processing unit accesses the platform components, and in turn the peripheral devices.

SUMMARY

This summary is provided to introduce concepts related to a low pin count controller, which are further described below in the detailed description. This summary is not intended to identify essential features of the claimed subject matter nor is it intended for use in determining or limiting the scope of the claimed subject matter.

Method(s) and a system(s) for low pin count controller to facilitate sharing of peripheral devices among multiple hosts of a computing system, are described herein. In one implementation, the LPC controller includes a microcontroller, an LPC-IN unit and an LPC-Host unit to facilitate sharing of the peripheral devices. Further, the LPC controller is interfaced to the hosts via an on-chip bus or an LPC-In bus. The LPC-IN unit and the microcontroller are provided with a logic to moderate among the access requests, such as target accesses, DMA accesses, and BM accesses. The LPC controller can be configured to operate in a software mode and an auto mode. Based on the mode of operation of the LPC controller, the moderation and/or arbitration is performed between the access requests and accordingly access to a peripheral device is provided to a host.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
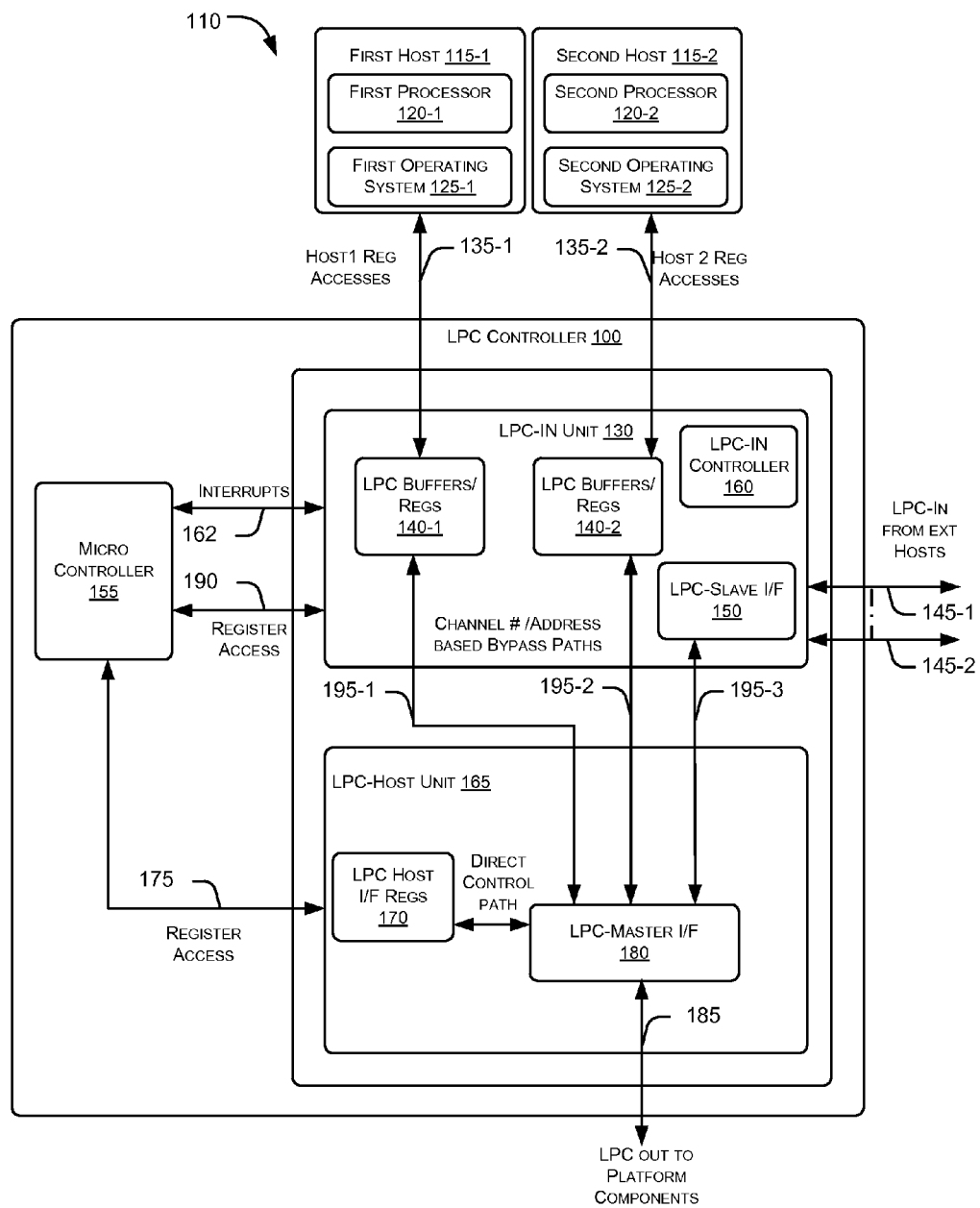
FIG. 1 illustrates a multi-host low pin count (LPC) controller, according to an embodiment of the present subject matter.

The present subject matter relates to a multi-host low pin count controller to support sharing of peripheral devices in a multi-host computing system. Examples of the peripheral devices include, but are not limited to, legacy devices like input/output (I/O) devices, such as keyboards and mouse, and memory devices, which may include any type of volatile or nonvolatile memory, such as DRAM, SRAM, flash memory, electrically programmable read only memory (EPROM), electrically erasable programmable read only memory (EE-PROM), magnetic storage media, or optical storage media. Further, a host can be understood as a processing unit, of a computing system, running its own operating system. Accordingly, the multi-host computing system may be understood as a computing system having a plurality of hosts, i.e., a plurality of operating systems or processing units running on the computing system.

Typically in computing systems, each host has a dedicated LPC interface and dedicated peripheral devices. Further, to access the peripheral devices, each host has a dedicated LPC controller. Thus, in a multi-host computing system, multiple LPC controllers and multiple peripheral devices are provided, which increases overall size and complexity of the multi-host system due to redundancy of components, such as the peripheral devices and the LPC controllers.

To facilitate sharing of the peripheral devices by the multiple hosts, the computing system includes a multi-host LPC controller. In one implementation, the LPC controller seamlessly interfaces the hosts with the peripheral devices. The host may be interfaced to the LPC controller via an on-chip bus or an LCP-IN bus. In case the LPC controller is provided on a south bridge of the host, the host may be interfaced through the on-chip bus. On the other hand, if the LPC controller is introduced not as a part of the south bridge of the host, say, beside the south bridge, the host is interfaced to the LPC controller through the LPC-In bus.

Further, the LPC controller is configured to manage various access cycles, such as target access cycles, for example, I/O cycles, memory cycles, and firmware hub cycles (also referred to as target access cycles); DMA access cycles; and BM access cycles. In one implementation, for each of the access cycles, the LPC controller is configured to operate in two modes, namely, software mode and auto mode. For the target access cycles, the auto mode may include three sub-modes, viz., active host mode, fixed host mode, and arbitrated mode. Further, for the DMA access cycles and BM access cycles, the auto mode includes an active host mode and a fixed host mode.

In one implementation, the LPC controller includes a microcontroller and an LPC-IN controller to moderate the access requests from various hosts. In each mode, the LPC-IN controller intercepts the access requests from the hosts and based on the mode of the LPC controller, the LPC-IN controller either transfers the requests to a microcontroller for arbitration or based on a programmed logic takes necessary action to facilitate sharing of the peripheral devices.

Devices that can implement the disclosed system(s) and method(s) include, but are not limited to, desktop computers, hand-held devices, multiprocessor systems, microprocessor based programmable consumer electronics, laptops, network computers, minicomputers, mainframe computers, and the like which utilize multiple processors on the same hardware platform.

FIG. 1 illustrates a multi-host low pin count (LPC) controller 100 implemented in a multi-host computing system 110, according to an embodiment of the present subject matter. The multi-host computing system 110 includes, but is not limited to, a desktop computer, a hand-held device, a laptop or other portable computer, a mobile phone, a personal digital assistant (PDA), a tablet personal computer, a netbook, a workstation, and the like, which utilize multiple processors on the same hardware platform. The multi-host computing system 110 is configured to run multiple operating systems, such as Linux, Unix, Microsoft® Windows®, Mac OS X®, Android, and the like. Although the present subject matter is described with reference to a multi-host computing system 110 running particular operating systems, the present subject matter may be implemented in other operating systems, albeit with a few variations, as will be understood by a person skilled in the art.

As illustrated, the multi-host computing system 110, amongst other things, includes a plurality of hosts, for example, a first host 115-1 and a second host 115-2. The multi-host computing system 110, for ease of explanation, has been depicted as having two hosts, viz. the first host 115-1 and the second host 115-2. However, it will be understood that the same concepts may be extended to any number of hosts. The first host 115-1 includes a first processor 120-1 and a first memory (not shown in the figures) having a first operating system 125-1. Similarly, the second host 115-2 includes a second processor 120-1 and a second memory having a second operating system 125-2. The other components of the multi-host computing system 110 are concurrently shared by the two hosts 115-1 and 115-2. Further, the two hosts 115-1 and 115-2 may be collectively referred to as the hosts 115 and individually referred to as host 115.

The multi-host computing systems 110 may be used to perform different functions on the same hardware platform. Each host 115 of the multi-host computing system 110 may provide a particular advantage over different host. For example, in the multi-host computing system 110 the first host 115-1 may provide better performance or support more applications than the second host 115-2, however, the second host 115-2, may consume less resources, such as memory, processing power, battery power when compared to the first host 115-1. In such a scenario, the computing system may implement the first host 115-1 for application processing and computational purposes whereas may implement the second host 115-2 during idle state.

The hosts 115 access the peripheral devices (not shown in the figures) via the multi-host LPC controller 100. The peripheral devices include, for example, input/output (I/O) devices, such as keyboards, mouse, and memory devices, which may store system start-up code, manageability code, operating system data, application code, program data, or function as a scratch pad for hosts 115 or I/O devices. The system start-up code may include the necessary software to configure or boot components within the multi-host computing system 110, and may include basic input/output system (BIOS) information. The peripheral devices are interchangeably, referred to as, the legacy devices or platform components. The legacy devices are addressable in I/O address space or memory address space. Examples of the legacy devices may include input/output (I/O) controller devices, such as super I/O chip, embedded controller, floppy disk controllers, serial port controllers, parallel port controllers, audio controller, and keyboard controllers.

The hosts 115 may be interfaced with the multi-host LPC controller 100, hereinafter referred to as the LPC controller 100, through any of the interfaces known in the art, for example, a register interface, such as an Advanced Extensible Interface (AXI) bus, an Advanced High Performance Bus (AHB), a Peripheral Connect Interface (PCI) bus, an open core protocol bus, and, a PCI Express bus; and an LPC interface. Accordingly, the hosts 115 and the peripheral devices may include these interfaces for generating and for responding to LPC signals on an LPC bus. The interfaces and the LPC controller 100 enable the multi-host computing system 110 to implement memory, I/O, firmware hub, DMA, and bus master transactions or cycles over the LPC bus. The access cycles which can be initiated by the hosts 115 are memory cycles, I/O cycles, and firmware hub cycles, while the accesses that can be initiated by slaves are DMA and bus master cycles. The examples of slave include, but are not limited to, super I/O chip, keyboard controller, and embedded controller.

The LPC controller 100 may be introduced as a part of a south bridge chip or may be provided beside the south bridge and accordingly may be interfaced with the hosts 115 via an on-chip bus or an LPC-IN bus. The hosts 115 are interfaced to the peripheral devices via an LPC-IN unit 130 of the LPC controller 100. In case the LPC controller 100 is introduced as a part of the south bridge of a host, the host may be interfaced with the LPC controller 100 through the on-chip bus as indicated by the arrows 135-1 and 135-2 (also referred as host access registers). In said case the host is interfaced with the corresponding LPC buffers or LPC registers, for example, LPC buffers 140-1 and 140-2. In said case, the LPC controller 100 appears to the host as a dedicated LPC controller 100 and the host will not be able to perceive or monitor the transactions happening from the alternate hosts 115. Thus, from the host perspective, the LPC controller 100 appears to be a traditional LPC controller 100.

In case the LPC controller 100 is provided beside the south bridge of a host, the host, which may also be understood as an external host, is interfaced to the LPC controller 100 through the LPC-IN bus as indicated by arrows 145-1 and 145-2. In said case, the LPC-IN unit 130 is interfaced as an LPC slave to the host through an LPC-slave interface 150. For a host interfacing through the LPC slave interface 150, the LPC controller 100 stays transparent. Further, the host (the external host) may receive a delayed response in reply to an access request. The host may receive the delayed response since the access requests are routed through LPC IN Bus (indicated by the arrows 145) before the access requests are directed to LPC OUT Bus 185. Additionally, the responses to the access requests are also sent from the LPC out Bus 185 to the LPC IN bus 145, which may add to the delay in the response. Further, there may be some delay due to arbitration in case of multiple hosts accessing the LPC OUT Bus 185. Thus, the hosts connected through the LPC IN bus 145 may see the responses as delayed responses.

As mentioned previously, the LPC controller 100 is configured to manage various access cycles, such as target access cycles, for example, I/O cycles, memory cycles, and firmware hub cycles; DMA access cycle; and BM access cycles. In one implementation, for each of the access cycles, the LPC controller 100 is configured to operate in two modes, namely, software mode and auto mode. For the purposes of explanation and not as limitation, for the target access cycles, the auto mode may include three sub-modes, viz., active host mode, fixed host mode, and arbitrated mode. Further, for the DMA access cycles and BM access cycles, the auto mode includes an active host mode and a fixed host mode.

In each mode, the LPC-IN unit 130 intercepts the requests from the hosts 115 and based on the mode, which is active, the LPC-IN transfers the requests to a microcontroller 155 for arbitration. In one implementation, in case of the software mode for target, an LPC-IN controller 160 of the LPC-IN unit 130 intercepts all the requests and interrupts the microcontroller 155 to arbitrate among the requests. For the target accesses, in the software mode a request initiated by a host, say, the first host 115-1, are intercepted by the LPC-IN controller 160. The request intercepted by the LPC controller 100 is terminated at the LPC-IN unit 130 and an interrupt is generated to the microcontroller 155 as indicated by arrow 162. It will be understood that the microcontroller 155 can identify the address range of a host based on the received interrupts. Further, based on a programmed logic of the microcontroller 155, the microcontroller 155 may arbitrate the target access requests from multiple hosts 115. In one implementation, the microcontroller 155 determines if the request from the first host 115-1 is conflicting with any other host, say, the second host 115-2. For example, if one host, say the first host 115-1, is running in-parallel and asynchronously with the rest, tries to program the embedded controller to sequence the system to S5 state while the other host, say the second host 115-2, is still active.

In said example, the microcontroller 155 performs a software based analysis on a buffer area corresponding to the first host 115-1, in the present case, LPC buffer 140-1. Further, the microcontroller 155 can further re-initiate the transfer after any translation that needs to be done. Referring to previously mentioned example, the microcontroller 155 can further re-initiate the transfer to avoid the system to transition to S5 as the second host 115-2 is active. The microcontroller 155 can re-initiate the host request on a LPC-Host unit 165 via LPC-host interface registers 170 as indicated by arrow 175. Further, from the LPC-Host unit 165 interface registers, the request may be forwarded to the concerned platform component via a LPC-Master interface 180 as indicated by the arrow 185. Based on the response received from the platform component, the microcontroller 155 sends an appropriate response back to the LPC-IN unit 130 as indicated by the arrow 190. Further, the LPC-IN controller 160 further sends the response to the first host 115-1 via the LPC registers as indicated by the arrow 135-1, thus completing the transaction loop.

In an example where there are two hosts, say, the first host 115-1 and the second host 115-2 requesting for a memory read, the micro controller 155 receives interrupts after the requests are intercepted, by the LPC-IN controller 160, in the LPC buffer 140-1 and the LPC buffer 140-2 respectively. Based on the Host access registers or interfaces 135, the host interface is kept in "wait" mode or "retry" mode. It will be understood that the "wait mode" and the "retry mode" will be activated based on an underlying bus protocol and the host. For example, Host bus interface 135 may not support "retry mode" or a host, say, the first host 115-1, may not support the retry mode, accordingly, in said example there may be no "retry mode". Once the requests are intercepted, the microcontroller 155 may be interrupted. Based on the software analysis (i.e., the programmed logic of the microcontroller 155), the microcontroller 155 initiates the read corresponding to a chosen host, say 115-1 on to the LPC out Bus 185. The slave response, in this case the read data, is received and stored in the LPC Master I/F 180. Once the slave response is received, the same may be stored in the LPC Host I/F registers 170 and an interrupt is generated to the microcontroller 155. Based on the interrupt, the microcontroller 155 reads the slave response from the LPC Host IF REGs 170 and sends a response back to the first host 115-1 through corresponding LPC buffer Register 140-1. Once the slave response is provided to the first host 115-1, the microcontroller 155 does the above re-initiation of transaction on the LPC out Bus 185 and the slaves response for the second host 115-2 are provided through the LPC host I/F registers 170. Further, till the slave response is sent back to the second host 115-2, the host access bus 135-2 is kept in wait state.

In one implementation, for the target access, in the auto mode, the LPC-IN controller 160 includes a logic to directly route the incoming accesses from any of the hosts 115 to the peripheral devices as indicated by the arrow 195-1, 195-2, and 195-3. In the auto mode, the target accesses of IO/Memory/Firmware Hub can be routed based on program selectable direct access address range on the LPC controller 100. For example, in the active mode the accesses from a current active host, say the first host 115-1, will be routed to the peripheral devices; while the accesses from other hosts, say, the second host 115-2 are terminated in the host specific buffer areas, such as the LPC-buffer 140-2 and an interrupt is given to the microcontroller 155 for further analysis as explained in the software mode. The active mode may be considered to be useful for a case where one operating system is used at a time in the foreground. For example, in a multi-host computing system 110 there is only one host who is using the display at a time, in such a case, all the user input devices like keyboard and mouse need to be connected to the active host and hence transfers to these devices are allowed from the active host only.

In the fixed mode, the LPC-IN controller 160 includes a logic to directly route the accesses from a chosen host, say, the first host 115-1, to the peripheral devices while the other hosts, say, the second host 115-2 accesses are terminated in the buffers and interrupt is given to the software for further analysis as explained in the software mode. In said mode, the LPC-IN controller 160 intercepts the request from the first host 115-1 and based on the address range of the first host 115-1, it determines if the first host 115-1 is the chosen host or not for the concerned peripheral device. Further, if it is determined that the first host 115-1 is the chosen host, the first host 115-1 is provided access to the concerned peripheral device and the request from the second host 115-2 may be sent to the microcontroller 155, which may send the second host 115-2 an error or a dummy response.

In the arbitrated mode, the LPC-IN controller 160 implements an arbitration approach, such as, round robin, to determine a host to which the access to the peripheral device is to be given and the winner's transaction is forwarded to the peripheral device.

For DMA and BM access cycles, which are initiated by the slaves, such as super I/O chip, keyboard controller, and embedded controller, all the requests are intercepted by LPC master interface 180. As mentioned previously, for the DMA access cycles and the BM access cycles, the LPC controller 100 may work in any of the two modes, the software mode and the auto mode. In the software mode peripheral accesses are analyzed before forwarding to a host. As explained for the target access, in the software mode all the DMA accesses from the peripheral devices are intercepted and interrupt is generated to the microcontroller 155 to determine the host to which the access needs to be routed.

Further, in the auto mode, the LPC-IN controller 160 includes a logic to directly route the peripheral accesses to the chosen host as indicated by the arrows 195-1, 195-2, and 195-3. The auto mode includes two sub modes, the active host mode and the fixed host mode. Further, a DMA channel can be programmed to be in an auto mode or a software mode.

When a peripheral device requests DMA for the channel, the LPC Master I/F 180 determines if a DMA channel is programmed for the active host mode or fixed host mode. If it is determined that the DMA channel is programmed for the active mode, the request is routed to a host specific DMA controller module (not shown in the figures) in the LPC-IN unit 130 by the LPC Master IF 180. Accordingly, based on the host, which is currently active, the DMA access is routed to the currently active host. For example, a keyboard may be shifted to a host which is on the foreground. For the requests to the external host, the DMA request is asserted on the incoming LPC-IN bus, the external host sees the request coming from a peripheral device.

If it is determined that the DMA channel is programmed for a fixed host mode, all the peripheral requests are routed to a chosen fixed host irrespective of the fact whether the host is running in foreground or background. The logic explained for the DMA access may be extended to the BM access as well.

Figure 2:
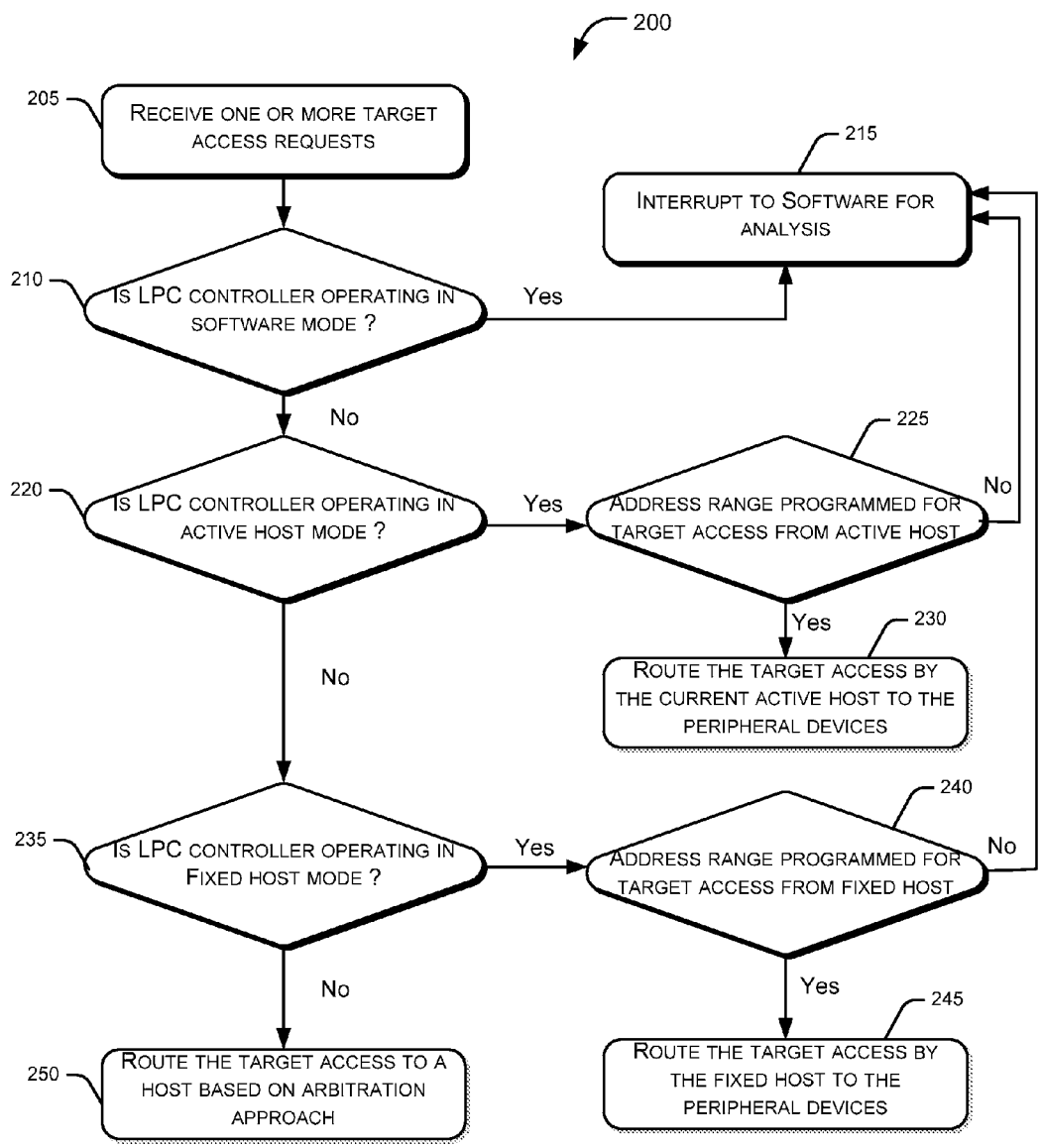
FIG. 2 illustrates a method for moderating target accesses in a multi-host computing system, according to an embodiment of the present subject matter.
Figure 3:
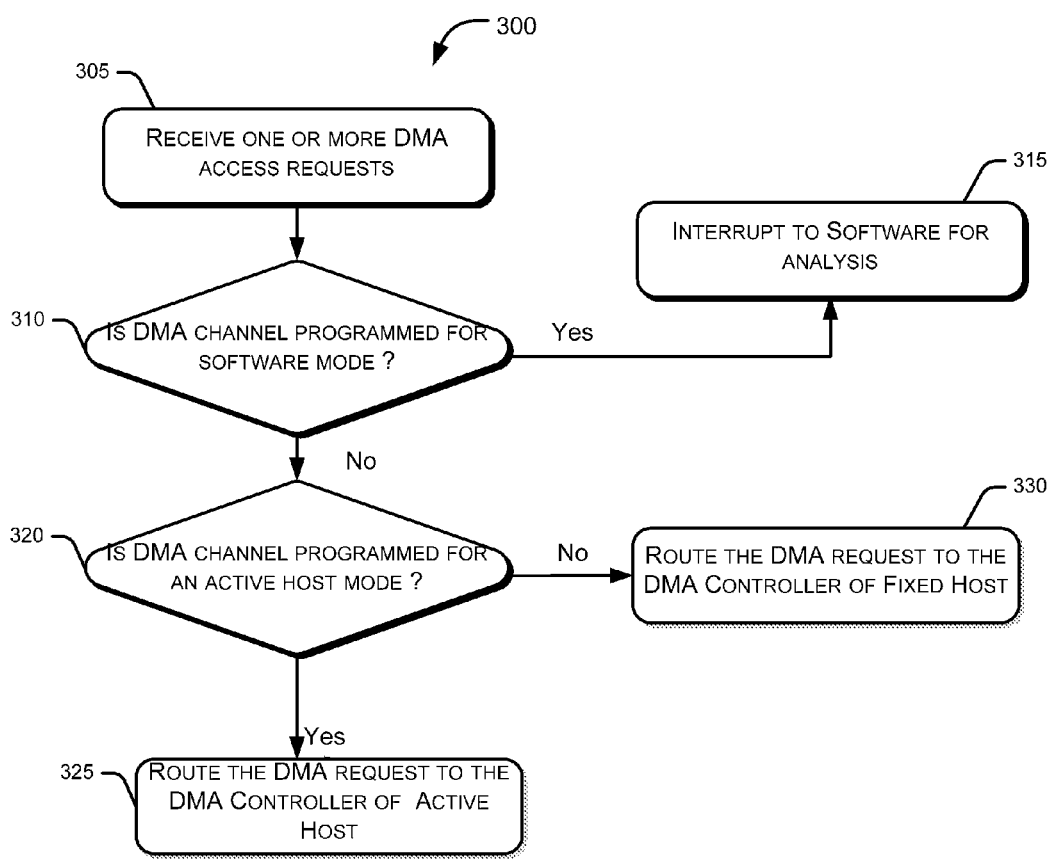
FIG. 3 illustrates a method for moderating direct memory access (DMA) and bus master (BM) accesses in the multi-host computing system, according to an embodiment of the present subject matter.

FIGS. 2 and 3 illustrate an exemplary method 200 and 300 for moderating target accesses, DMA accesses, and BM accesses in a multi-host computing system, such as the multi-host computing system 110, according to an embodiment of the present subject matter. The exemplary methods 200 and 300 may be described in the general context of computer executable instructions embodied on a computer-readable medium. Generally, computer executable instructions can include routines, programs, objects, components, data structures, procedures, modules, functions, etc., that perform particular functions or implement particular abstract data types. The methods 200 and 300 may also be practiced in a distributed computing environment where functions are performed by remote processing devices that are linked through a communications network. In a distributed computing environment, computer executable instructions may be located in both local and remote computer storage media, including memory storage devices.

The order in which the method 200 and 300 are described is not intended to be construed as a limitation, and any number of the described method blocks can be combined in any order to implement the method 200 and 300, or an alternative method. Additionally, individual blocks may be deleted from the method 200 and 300 without departing from the spirit and scope of the method, systems and devices described herein. Furthermore, the methods 200 and 300 can be implemented in any suitable hardware, software, firmware, or combination thereof.

Additionally, the methods 200 and 300 have been described in the context of the multi-host computing system 110 and the LPC controller 100 however, other embodiments may also be possible as will be understood by a person skilled in the art.

Referring to the method 200, at block 205, one or more target access requests are received from one or more hosts, for example, the first host 115-1 and the second host 115-2 or from external host through 145. In one implementation, the target access requests are received by the LPC controller 100 via an On-Chip bus or an LPC-IN chip bus. Further, the LPC-IN unit 130 of the LPC controller 100 is configured to intercept all the target accesses requested by the hosts 115.

At block 210, it is determined if the LPC controller 100 is in a software mode. If it is determined that the LPC controller is in the software mode, block 210 branches to block 215.

At block 215, an interrupt is generated for software analysis based on which an action is taken. In one implementation, the interrupt is generated to the microcontroller 155 of the LPC controller 100. For example, if the first host 115-1 sends a request to shut down system, while the second host 115-2 is still active. In said example, the microcontroller 155 will arbitrate between these two requests such that when the first host 115-1 is inactive, the power to the peripheral devices is still provided so that the second host 115-2 can function properly.

At block 210, if it is determined that the LPC controller 100 is not in the software mode, block 210 branches to block 220. At block 220, it is determined if the LPC controller 100 is in an active host mode. If at block 220, it is determined that the LPC controller 100 is in the active host mode, block 220 branches to block 225.

At block 225 it is further determined if an address range of the host that requested for the target access is programmed to provide the access. In one implementation, in the active host mode, the host which is in the foreground or which is currently active is provided access to the peripheral device. Based on the address range of the host, if it is determined the host that generated the target access request is an active host, block 225 branches to block 230. In one implementation, the LPC-IN controller 160 has the logic to determine if the address range of the host is in the programmed address range or not.

At block 230, the target access request is directly routed to the concerned peripheral device. In one implementation, the LPC-IN controller 160 routes the request to the peripheral device via the LPC-Host unit 165.

However, if at block 225, it is determined that the host that generated the target request is not the active host or to say is in the background, block 225 branches to block 215, where an interrupt is generated for the software analysis. In one implementation, the LPC-IN controller generates an interrupt to the microcontroller 115 to perform a software based analysis.

Referring back to block 220, if it is determined that the LPC controller 100 is not in the active host mode, block 220 branches to block 235. At block 235, it is determined if the LPC controller 100 is in a fixed host mode. If at block 235, it is determined that the LPC controller in the fixed host mode, block 235 branches to block 240. At block 240, it is determined based on an address range of the host that requested for the target access, that the access to the peripheral device is to be provided or not. In one implementation, in the fixed host mode, target access requests from a chosen host are always routed to the peripheral devices, while target access requests from the other hosts are terminated. If at block 240, it is determined that the host that generated the target access request is the chosen host, block 240 branches to block 245.

At block 245, the target access request from this host (which is the fixed host) is directly routed to the peripheral devices as explained at block 230. However, if at block 240, it is determined that the host is not the chosen host, block 240 branches to block 215, as explained at block 225.

Referring back to block 235, if it is determined that the LPC controller is not in the fixed host mode, block 235 branches to block 250. Further, if the LPC controller is not in software, active, or fixed host mode, it may be understood that the LPC controller is in the arbitrate host mode. Therefore, at block 250, an arbitration protocol is invoked and a host to which target access should be provided is determined. For example, the LPC-IN controller 160 may arbitrate among the target access requests received from the multiple hosts. Accordingly, the target access request of a winner host based on the arbitration approach is routed to the peripheral devices.

Referring to method 300, at block 305 one or more DMA access requests are received from one or more peripheral devices are received.

An alternative implementation can provide different choices of the mode per different address ranges. In such implementation, the LPC Controller 100 needs to support different modes in parallel for different address ranges for the target accesses.

At block 310, it is determined if a DMA channel through which the DMA access request is received, is programmed for a software mode. If it is determined that the DMA channel is in the software mode, block 310 branches to block 315.

At block 315, an interrupt is generated for software analysis based on which an action is taken. In one implementation, the interrupt is generated to the microcontroller 155 of the LPC controller 100.

However, if at block 310 it is determined that the DMA channel is not in the software mode, block 310 branches to block 320. At block 320, it is determined that the DMA channel through which the DMA access request is received, is programmed for an active host mode or not. If at block 320, it is determined that the DMA channel is programmed for the active host mode, block 320 branches to block 325. At block 325, the DMA access request is routed to a DMA controller corresponding to a currently active host.

However, if at block 320, it is determined that the DMA access request is not programmed for the active host mode, block 320 branches to block 330. When the DMA channel is not programmed for the active host mode and software mode, it may be understood that the DMA channel is programmed for a fixed host mode. At block 330, the DMA access request may be routed to a DMA controller corresponding to a host, who is selected as a fixed host, i.e., the DMA access request is routed to the DMA controller irrespective of the fact whether the corresponding host is in foreground or background.

Although the method 300 has been explained with reference to DMA accesses, it will be understood that the same principles may extended for BM accesses as well.

Also, even though implementations of a multi-host LPC controller 100 have been described in language specific to structural features and/or methods, it is to be understood that the invention is not necessarily limited to the specific features or methods described. Rather, the specific features and methods are disclosed as exemplary implementations for the multi-host LPC controller 100.

We claim:

1. A Low Pin Count (LPC) controller (100) comprising:
    an LPC-IN unit (130) configured to receive one or more target access requests for accessing a LPC device coupled to a multi-host computing system (110), from at least one host of the multi-host computing system (110);
    a LPC-IN controller (160) configured to,
        generate an interrupt for each of the one or more target access requests, based on an operational mode of the LPC controller (100);
        analyze the one or more target access requests based on an operational mode of the LPC controller (100) on generation of the interrupt;
    a microcontroller (155) configured to
        arbitrate the one or more target access requests on receiving the interrupt based on the analysis; and
        provide access to the LPC device based in part on the arbitration and a sharing mechanism supported by the LPC device.

2. The LPC controller (100) as claimed in claim 1, wherein the operational mode of the LPC controller (100) is at least one of a software mode, wherein access is provided to at least one host of the multi-host computing system (110) based on the arbitration, an active host mode wherein the access is provided to a currently active host of the multi-host computing system (110), and a fixed host mode wherein the access is provided to a pre-selected host of the multi-host computing system (110).

3. The LPC controller (100) as claimed in claim 1, wherein the arbitration is based in part on power states of the at least one host of the multi-host computing system (110), a round robin mode, and an user-defined mode.

4. The LPC controller (100) as claimed in claim 1, wherein the microcontroller (155) is further configured to,
    ascertain the operational mode of the LPC controller (100) to be an active host mode;
    determine whether a currently active host of multi-host computing system (110), is configured for accessing the LPC device based on an address range of the currently active host, on ascertaining the operational mode of the LPC controller (100) to be the active host mode;
    provide access of the LPC device, to the currently active host, based on the configuration of the currently active host.

5. The LPC controller (100) as claimed in claim 1, wherein the microcontroller (155) is further configured to,
    ascertain the operational mode of the LPC controller (100) to be a fixed host mode;
    determine whether a pre-selected host of multi-host computing system (110), is configured for accessing the LPC device based on an address range of the pre-selected host on ascertaining the operational mode of the LPC controller (100) to be the fixed host mode;
    provide access of the LPC device, to the pre-selected host, based on the configuration of the pre-selected host.

6. The LPC controller (100) as claimed in claim 1, wherein the LPC-IN unit (130) is further configured to intercept the one or more target access requests for accessing the LPC device from the at least one host of the multi-host computing system (110).

7. The LPC controller (100) as claimed in claim 1, wherein the LPC controller (100) is configured as a slave LPC device of the at least one host of the multi-host computing system (110).

8. The LPC controller (100) as claimed in claim 1, wherein the LPC controller (100) is configured as a dedicated LPC device of the at least one host of the multi-host computing system (110).

9. The LPC controller (100) as claimed in claim 1, wherein the LPC device is coupled with a bus to communicate with the at least one host of the multi-host computing system (110), wherein the bus conform to at least one of an Advanced Extensible Interface (AXI) bus specification, an Advanced High Performance Bus (AHB) specification, a Peripheral Connect Interface (PCI) bus specification, an open core protocol bus specification, and a PCI Express bus specification.

10. The LPC controller (100) as claimed in claim 1, wherein the LPC controller (100) is further configured to:
    receive a command to power off the LPC device coupled to the multi-host computing system (110), from at least one host of the multi-host computing system (110);
    determine whether the LPC device is in use by at least another host of the multi-host computing system (110);

masking the command to power off the LPC device on determining the LPC device to be in use by the at least another host.

11. The LPC controller (100) as claimed in claim 10, wherein the LPC controller (100) is further configured to execute the command so as to power off the LPC device on determining the LPC device not to be in use by the at least another host of the multi-host computing system (110).

12. A multi-host computing system (110) comprising:
   a plurality of processors;
   a LPC controller (100) as claimed in claim 1, communicatively coupled to at least one of the plurality of processors.

13. A method for providing at least one of a direct memory access (DMA) and a bus master (BM) access in a multi-host computing system (110) running a plurality of operating systems, the method comprising:
   receiving at least one of a direct memory access (DMA) access request, and a bus master (BM) access request from a peripheral device coupled to at least one host of the multi-host computing system (110);
   determine an operational mode of a DMA channel of the multi-host computing system (110) to identify a currently active host of the multi-host computing system (110);
   route at least one of the DMA access request, and the BM access request to a DMA controller of the currently active host; and
   provide at least one of a DMA access and a BM access to the peripheral device of the currently active host, based on the routing, so as to provide access to at least one LPC device coupled to the multi-host computing system (110).

14. The method as claimed in claim 13, wherein the method further comprises:
   route at least one of the DMA access request, and the BM access request to a DMA controller of a pre-selected host of the multi-host computing system (110) on determining the operational mode of the DMA channel to be a fixed host mode.

\* \* \* \* \*